United States Patent [19]

Landriault et al.

[11] Patent Number: 4,928,999
[45] Date of Patent: May 29, 1990

[54] ELASTOMERIC GUARD SEAL FOR TUBULAR CONNECTIONS

[75] Inventors: L. Steven Landriault, Jersey Village; Donald J. Ortloff; Charles A. Bollfrass, both of Houston, all of Tex.

[73] Assignee: Hydril Company, Houston, Tex.

[21] Appl. No.: 605,378

[22] Filed: Apr. 30, 1984

[51] Int. Cl.$^5$ .............................................. F16L 15/04
[52] U.S. Cl. ................................... 285/113; 285/334; 285/351
[58] Field of Search .............. 285/333, 334, 351, 355, 285/332.2, 113, 109, 347, 370, 924, 354; 277/1, 168

[56] References Cited

U.S. PATENT DOCUMENTS 3,489,438  1/1970  McClure .

FOREIGN PATENT DOCUMENTS 567463  12/1932  Fed. Rep. of Germany .
2064041  6/1981  United Kingdom .

Primary Examiner—Gary L. Smith
Assistant Examiner—Eric K. Nicholson
Attorney, Agent, or Firm—Vaden, Eickenroht, Thompson & Boulware

[57] ABSTRACT

A tubular connection comprising a pin end and a box end of adjacent joints having a conical metal-to-metal seal located with respect to the pin end forward thread set and its nose, the improvement of a circumferential groove in the pin end forward of the metal-to-metal seal which carries an elastomeric sealing ring radially extending beyond the limits of the groove. The metal-to-metal makeup of the connection causes by conical deformation a slight wedge shape opening to form forward of the metal-to-metal seal. The elastomeric material extrudes to fill this wedge shape opening to thereby form a compound seal forward of the metal-to-metal seal.

17 Claims, 1 Drawing Sheet

FIG. 1
FIG. 2
FIG. 3
FIG. 4
FIG. 5
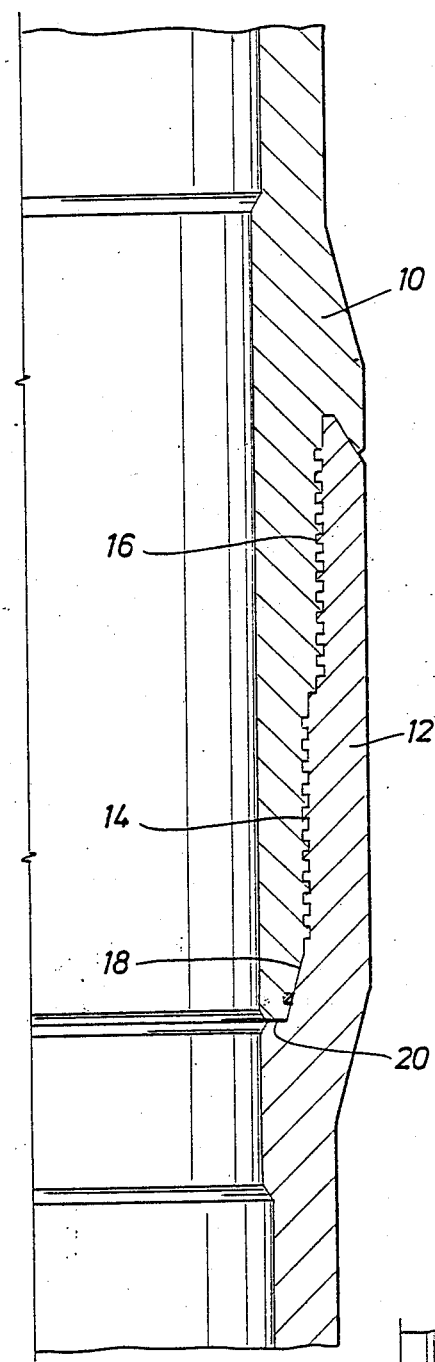
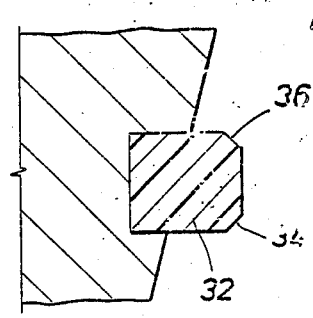
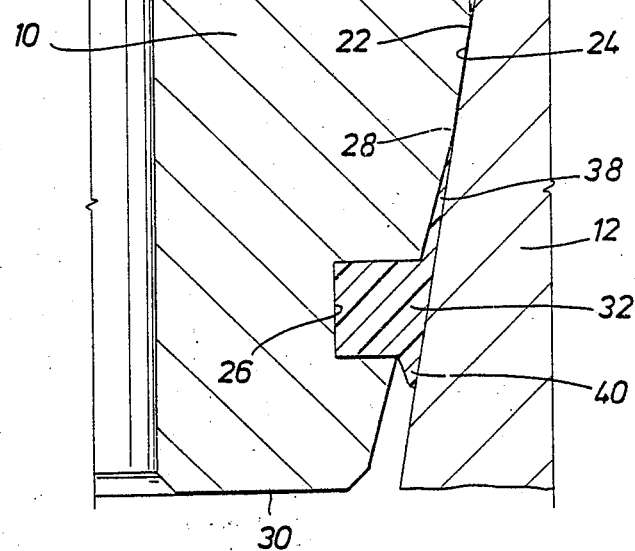
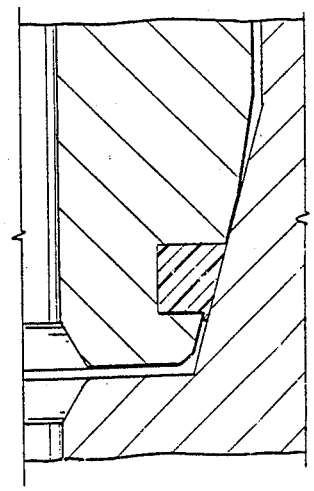
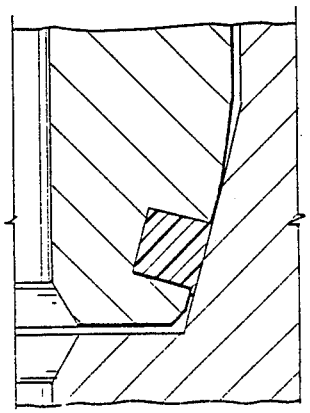

ELASTOMERIC GUARD SEAL FOR TUBULAR CONNECTIONS

BACKGROUND OF THE INVENTION

1. Field of the Invention

This invention pertains to connection configurations for tubular products and more particularly to augmenting the metal-to-metal sealing of the connections of such products and protecting the surfaces involved in such sealing connections.

2. Description of the Prior Art

Tubular goods generally comprise a plurality of individual joints connected together pin end to box end. The pin end of a tubular joint is the male end and generally includes at least one set of helical or spiral external threads. The box end is the accommodating female end and generally includes mating internal helical or spiral threads.

Tubular goods employed in the oil and gas industry include both the casing string and the production tubing string. In both cases the environmental operating conditions are often at high pressures and at high temperatures. The most effective and certain seals used in the industry today to prevent leaks in the connections of tubular goods are metal-to-metal seals. Such seals have extremely favorable sealing performance characteristics compared to rubber or other seals employing non-metal materials.

To effect a metal-to-metal seal, the pin end of the joint incorporates a sealing surface forward of the thread set or leading thread set on the pin end. This surface generally is tapered for establishing a conical sealing surface. The accommodating box end is similarly provided with a receiving shoulder sealing surface deep within the well of the box end and just beyond the limits of its thread set or deepest thread set. If the taper of the metal sealing surface of the pin end is at the preferred angle of 14° then this box end sealing surface is at the same angle. Therefore, when the pin end is screwed into the box end, the leading pin thread completely passes through the box end threads until sealing surface contact is made of the pin end with the box end. A further tightening of the connection after contact causes conical deformation of either or both the pin end and box end at the contact location. When the connection is completely made up there is metal-to-metal sealing surface engagement adjacent the threads and a slight wedge separation on the non-thread side of such engagement.

The engagement of the metal surfaces is perfectly satisfactory provided the surfaces are free of blemishes or foreign matter. However, tubular goods of the type just described are not uncommonly subjected to fairly rough treatment. For example, when two joints are brought together in a stabbing operation preliminary to connection makeup, the end of the pin is often scratched or gouged in a stabbing attempt with the ends slightly misaligned. In fact, an attempt may even be made to rotate a misaligned connection in hope and anticipation that the connection is aligned properly for makeup, not realizing that the joints are misaligned. Such rotation may cause grooving of the pin end sealing surface. Furthermore, tubular joints are often dragged in handling so that their ends are scraped. Again, this can result in damage to the pin end sealing surface. When the joints are then made up in the previously described manner, there is a weakness in the metal-to-metal seal engagement with the existence of one or more paths through which pressure leaks can occur.

The problem of scarring the pin end sealing surface in one or more of the manners just described or otherwise has long been recognized. It has been believed heretofore that when the sealing surface was damaged sufficiently to prevent effecting a satisfactory seal, the joint had to be taken out of service. If the surface was not too badly damaged, it could be remachined. If it was damaged a little, then either the connection made with the slightly damaged pin end had to be tested, which is a cumbersome operation at best under field conditions, or the decision had to be made, without adequate data, to use the joint as is or to remove it from service. A decision to remove an acceptacle joint is closely. A decision to use an unacceptable joint can be disastrous. Moreover, a perfectly good joint could be damaged in a makeup attempt just prior to makeup, also with disasterous consequences.

Many connections include an auxiliary or back-up or duplicate sealing area to minimize the possibility of failure when there is a bad metal-to-metal seal because of a leakage path condition, as just described. Such connections provide sealing surfaces at other locations in the thread configuration in addition to the metal-to-metal seal location described above.

Attempts to use a seal utilizing a material other than metal have not proved satisfactory because of their inability to satisfactorily operate as intended under the extreme pressure and temperature conditions that exist for the larger tubular products, for example, tubular products from 2⅞" to 14" used in conditions where the pressure is in excess of 20,000 psig and the temperature is up to about 450° F. An example of an unsatisfactory structure under these conditions is shown in U.S. Pat. No. 4,253,687 entitled "Pipe Connection", issued Mar. 3, 1981. This patent describes grooving the tapered surface of the pin end of a pipe connection and the placement therein of an annular O-ring made of Teflon or similar material. This would be done when the sealing surface was such that it would no longer be able to makeup a metal-to-metal seal. The O-ring would extend radially from the groove (FIG. 7) so that when the connection was subsequently made up (FIG. 8) the material would seal against the box surface (35) and even extrude slightly up the annulus between the pin and the box (at 77).

Although possibly acceptable for small tubular products and for low pressure conditions, such arrangement is totally unsuited for larger tubular goods and for higher pressure conditions. Under high pressures downhole, for example, the O-ring would not only extrude slightly, as shown in FIG. 7 of the '687 patent, it would be blown up annulus 75 and cause complete sealing failure.

Therefore, it is a feature of the present invention to provide an improved tubular connection for causing a compound seal with a conical metal-to-metal seal, the improved connection including an elastomeric material conforming to the metal-to-metal seal and even to minor blemishes therein.

It is another feature of the present invention to provide an improved compound sealing tubular connection employing an elastomeric compound that is used in such a way that it can be employed even in high pressure environmental conditions.

It is still another feature of the present invention to provide an improved tubular connection having an elastomeric material component that operates in making a compound seal, protects the end of the joint of which is is a part from damage, and is replaceable when the need arises.

SUMMARY OF THE INVENTION

The pin end of a pipe joint terminating in a conical surface for effecting a metal-to-metal seal is grooved in the sealing surface so as to leave a significant portion for effecting a metal-to-metal seal between the leading thread set and the groove. The groove is then filled with an elastomeric sealing ring, preferably made of a fluorocarbon plastic material capable of at least some elasticity under pressure conditions in excess of 20,000 psig and at a temperature of about 450° F. The radial dimension of the ring is such that it extends at least somewhat radially from the groove prior to connection makeup.

When the pin end is made up in the accommodating box end, the conical metal sealing surfaces slightly deform and the sealing ring is extruded therein to assume a wedge shape adjacent the metal-to-metal seal. The elastomeric material also accommodates to any small blemishes of the metal-to-metal seal. The elastomeric material is prevented from further extrusion by such seal and excess material not compressed back into the groove is forced to extrude back toward the end of the pin end.

The material can be used in the making of several subsequent connection makeups, even though the elastomeric material assumes a permanent distortion after its first use. As long as it is somewhat resilient or elastic, the sealing ring is reusable. However, once it has been used several times, or in case of breakage, a new ring can be employed without remachining or resurfacing the adjacent sealing metal surface.

The radial extension of the ring provides protection to the metal sealing surface during stabbing operation preliminary to connection makeup and otherwise during the handling of the tubular joint.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only a preferred embodiment of the invention and are therefore not to be considered limiting of its scope as the invention may admit to other equally effective embodiments.

In the Drawings:

FIG. 1 is a partial longitudinal cross-seciton of a tubular connection employing a preferred embodiment of the invention.

FIG. 2 is a partial cross-section of the groove and elastomer sealing ring in accordance with a preferred embodiment of the invention prior to initial connection makeup.

FIG. 3 is a partial cross-section of a preferred embodiment of connection after makeup between a pin end and an accommodating box end illustrating the operation of the sealing ring of the invention.

FIG. 4 is a partial cross-section of a preferred embodiment of the invention illustrating one example of a groove configuration.

FIG. 5 is a partial cross-section of an alternate embodiment of a satisfactory groove configuration.

DESCRIPTION OF THE PREFERRED EMBODIMENT

Now referring to the drawings and first to FIG. 1, a connection is illustrated in a partial cross-section of a pin end 10 of a tubular member being completely made up in an accommodating box end 12 of the adjacent tubular joint. In this embodiment, it may be seen that there are two thread sets included on the pin end, namely, thread set 14 which is closest to the end or nose of the pin end and thread set 16. In typical fashion thread set 14 is at a reduced diameter to thread set 16.

Although pressure sealing may occur at other locations, the primary sealing which occurs in the type of connection illustrated is a metal-to-metal seal 18 in the vicinity between the leading thread of thread set 14 and nose 20 of the pin end. It is well known that as the threads are tightened the metal-to-metal contact of the sealing surfaces of the respective pin end and box end causes conical deformation of one or both of the surfaces and results in a wedge shape separation toward the nose of the pin end from the metal-to-metal contact of the sealing surfaces. This is illustrated particularly in FIG. 3, where sealing surface 22 of the pin end makes contact with sealing surface 24 of the accommodating box end and results in a wedge separation below the location where these surfaces are no longer in engagement.

A groove 26 is located circumferentially about the end of pin end 10 between the location where the sealing surfaces separate, namely at point 28, and nose 20 of pin end 10. The groove is cut sufficiently deep into the pin end and is sufficiently wide that it occupies somewhere between 10 and 80 percent of the cross-sectional area of the pin end between points 28 and end 20, preferably less than about 50 percent. The exact dimension and even the exact shape is not critical to the invention. However, as shown in FIG. 4, the bottom of the groove is preferably parallel to the centerline of the tubular member or, alternatively the bottom of the groove is approximately parallel to the sealing surface, as shown in FIG. 5. In the embodiment shown, the sealing surface is at an angle of 14° to the centerline.

It is also preferable that the width of the groove is slightly wider than its depth, although again this is not critical for an operable embodiment. The two dimensions can be substantially equal or the depth can be greater than the width.

Located within groove 26 is an elastomeric ring 32. In its "at rest" position prior to inital connection makeup, as illustrated in FIG. 2, the cross-section of ring 32 is approximately rectangular. The ring is placed into the groove by stretching and allowing it to elastically contract within the groove. The sides of the groove are substantially perpendicular to the bottom of the groove and the ring conforms to sides and bottom of the groove. It may be further seen that the ring extends radially from the groove so that less than one-half of its dimension is actually radially beyond the limits of the groove. Preferably as well, the forward edge and the rearward edge of the top surface of ring 32 are chamfered at edges 34 and 36, respectively. A 45° chamfer angle is preferred.

The material employed for ring 32 is preferably a fluorocarbon plastic. An example of such a ring is polytetrafluroethylene, tetrafluoroethylene, commonly referred to as Teflon TFE. Other fluorocarbon polymers commericially known as fluoro-plastics, can be used. A glass-filled TFE material known as RMB-1 produced by Thermech Engineering of California has proved particularly satisfactory.

As further discussed below, the desirable operating characteristics of a suitable material for operation in accordance with the invention suggests that many materials would be suitable for the application of use.

Returning now to FIG. 3, the nose of pin end 10 is shown having been made up in box end 12 so as to effect a metal-to-metal seal between surfaces 22 and 24. As the makeup occurs, ring 32, since its material is elastomeric in nature, compresses back into groove 26 and also extrudes in wedge-shape conformity with the separation of the pin end and the box end. Wedge seal part 38 is the extruded portion of seal 32 in this direction and designates the portion of the extruded material before it comes into contact with point 28. At that point, further extrusion occurs forward of groove 26, namely at extrusion portion 40.

It may be seen that the result of the action which has just been described for the elastomeric sealing ring is to form a compound seal with the metal-to-metal seal which has long been known in the art. The portion of the ring which is just in front of the metal-to-metal seal not only forms an independent seal of its own, but bears against the metal-to-metal seal to ensure that blemishes, surface deposits and other deformaties that might cause a leakage path through the metal-to-metal seal under pressurized conditions are prevented from causing such leakage occurence, since the elastomeric material conforms to seal off such possible leakage paths and to thereby prevent highy pressure leaks that would have otherwise occurred from being a problem.

It may also be seen that because the metal-to-metal seal exists, even relatively high pressures downhole bearing against elastomeric seal 32 will not cause extrusion of the material from the groove up the annulus between the pin end and box end since there is no gap at this location which exists. The sealing connection which has just been described has been tested well above 20,000 psig at 450° F. and satisfactory operation has been observed.

It will be seen that the resilient seal surface must be of sufficient resilient composition so as to adequate flow into the wedge opening which has just been described. However, it does not have to have the ability to assume its original shape and dimension once the applied load has been removed when the connection is disconnected. Some resiliency must remain for further connection operation in the manner described. Hence, the material should have a sufficiently compressive yield strength so that the material stress under applied loads after assembly will be somewhat lower than the yield strength and so that there is a resistance to creep at temperatures up to 450° F.

It should also be mentioned that the material is desirably inert to gas impregnation which would otherwise result in rupture of the ring when removed from the environmental pressure, or result in swelling, softing and/or damage by corrosion such as by exposure to $H_2S$, $CO_2$, electromotive, and fluid flow errosion.

It has been found that the preferred materials mentioned above have been sufficiently reusable so as to be maintained through at least twenty make and break connections. However, it is also true that such seal rings are readily replaceable when the rings wear out or break.

It is also apparent that the rings not only perform a valuable sealing function during makeup, as described, but also protect the end of the pin end of the joint during handling, both during a stabbing operation as well as being carried or dragged during joint pick up and lay down. Hence, the ring effectively also acts as a damage guard against minor scrapes, scratches or impacts and acts as a crevice corrosion barrier.

While particular embodiments of the invention have been shown, it will be understood that the invention is not limited thereto. Many modifications may be made and will become apparent to those skilled in the art.

What is claimed is:

1. In combination with a tubular connection including
    a pin end having
        at least one thread set, and
        a conical metal sealing surface adjacent said thread set, and
    an accommodating box end having
        at least one box end thread set for making up the connection with said pin end thread set, and
        a conical metal sealing surface for making a metal-to-metal seal with said pin end metal sealing surface,
    said sealing improvement comprising
        said pin end having a circumferential groove forward of said pin end metal sealing surface, tightening of the metal-to-metal seal after surface contact causing wedge separation of said pin end and box end forward of the pin end metal sealing surface, and
        a compressible elastomeric sealing ring located in said groove and extending radially outwardly therefrom prior to connection makeup,
    whereby during makeup said elastomeric sealing ring extrudes in the direction of said metal-to-metal seal to form a compound wedge seal therewith in front thereof against pressures from within.

2. The sealing improvement in accordance with claim 1, wherein said pin end conical metal sealing surface is located longitudinally between said pin end thread set and the tip of the pin end, said groove being located in said pin end conical surface at a position of reduced outside diameter to that of said pin end conical metal surface.

3. The sealing improvement in accordance with claim 1, wherein said groove and sealing ring form a crevice corrosion barrier.

4. The sealing improvement in accordance with claim 1, wherein said elastomeric sealing ring is a fluorocarbon plastic material.

5. The sealing improvement in claim 4, wherein said elastomeric sealing ring is a TFE material.

6. The sealing improvement in claim 5, wherein said elastomeric sealing ring is a glass-filled TFE material.

7. The sealing improvement in accordance with claim 1, wherein said groove is rectangular in cross section and occupies between 10-80 percent of the cross-sectional area of the pin end between the metal sealing surface and the nose of the pin end.

8. The sealing improvement in accordance with claim 7, wherein said width of said groove is greater than its depth.

9. The sealing improvement with claim 7, wherein the front and back sides of said groove accommodating said elastomeric sealing ring are perpendicular to the centerline axis of said pin end.

10. The sealing improvement in accordance with claim 9, wherein the bottom of said groove is parallel to the centerline axis of said pin end.

11. The sealing improvement in accordance with claim 9, wherein the bottom of said groove is parallel with the conical metal sealing surface of said pin end.

12. The sealing improvement in accordance with claim 1, wherein said pin end metal sealing surface includes surface blemishes, said elastomeric seal extruding during connection makeup to fill against said blemishes to prevent leakage therepast.

13. The sealing improvement in accordance with claim 1, wherein said elastomeric sealing ring is operable in excess of 20,000 psig at 450° F.

14. The sealing improvement in accordance with claim 1, wherein said elastomeric sealing ring is replaceable.

15. The sealing improvement in accordance with claim 1, wherein said elastomeric sealing ring extrudes longitudinally toward the tip of the pin end once it forms a complete wedge seal with the metal-to-metal seal.

16. The sealing improvement in accordance with claim 1, wherein the top surface of said elastomeric sealing ring is chamfered at its front and rear edges.

17. The sealing improvement in accordance with claim 1, wherein less than half of said elastomeric sealing ring extends radially outwardly from said groove prior to conection makeup.

* * * * *